Jan. 1, 1963 R. A. BRUCE 3,071,279
MILK BOTTLE CARRIER AND ENCLOSURE
Filed April 25, 1960 3 Sheets-Sheet 2

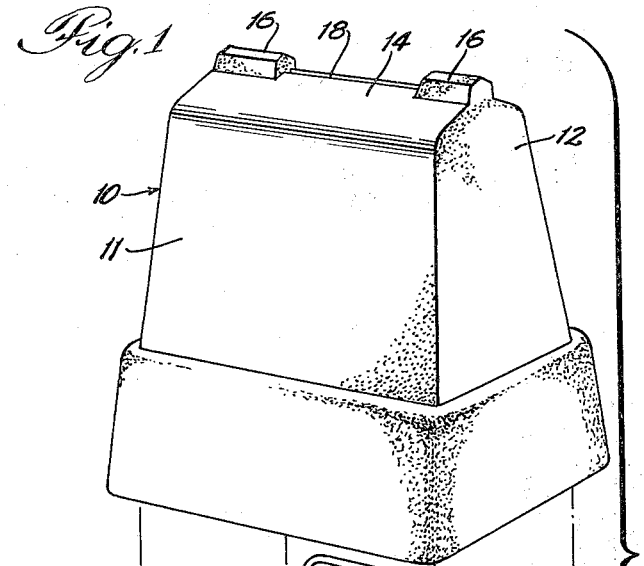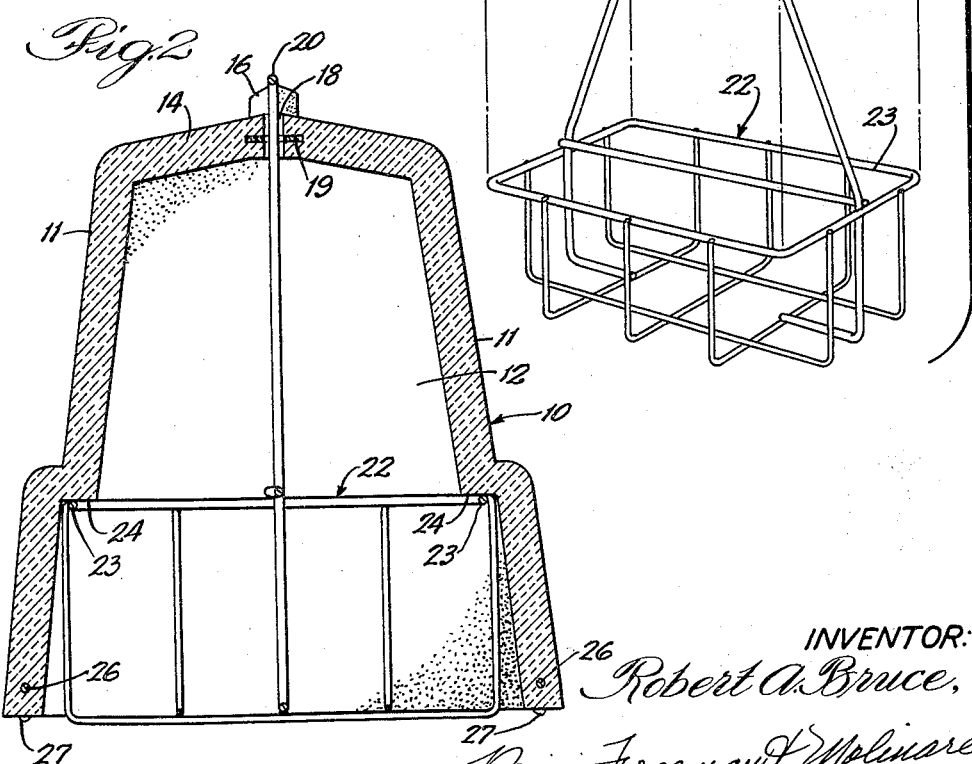

INVENTOR:
Robert A. Bruce,
BY Bair, Freeman & Molinare
ATTORNEYS.

Jan. 1, 1963 R. A. BRUCE 3,071,279
MILK BOTTLE CARRIER AND ENCLOSURE
Filed April 25, 1960 3 Sheets-Sheet 3
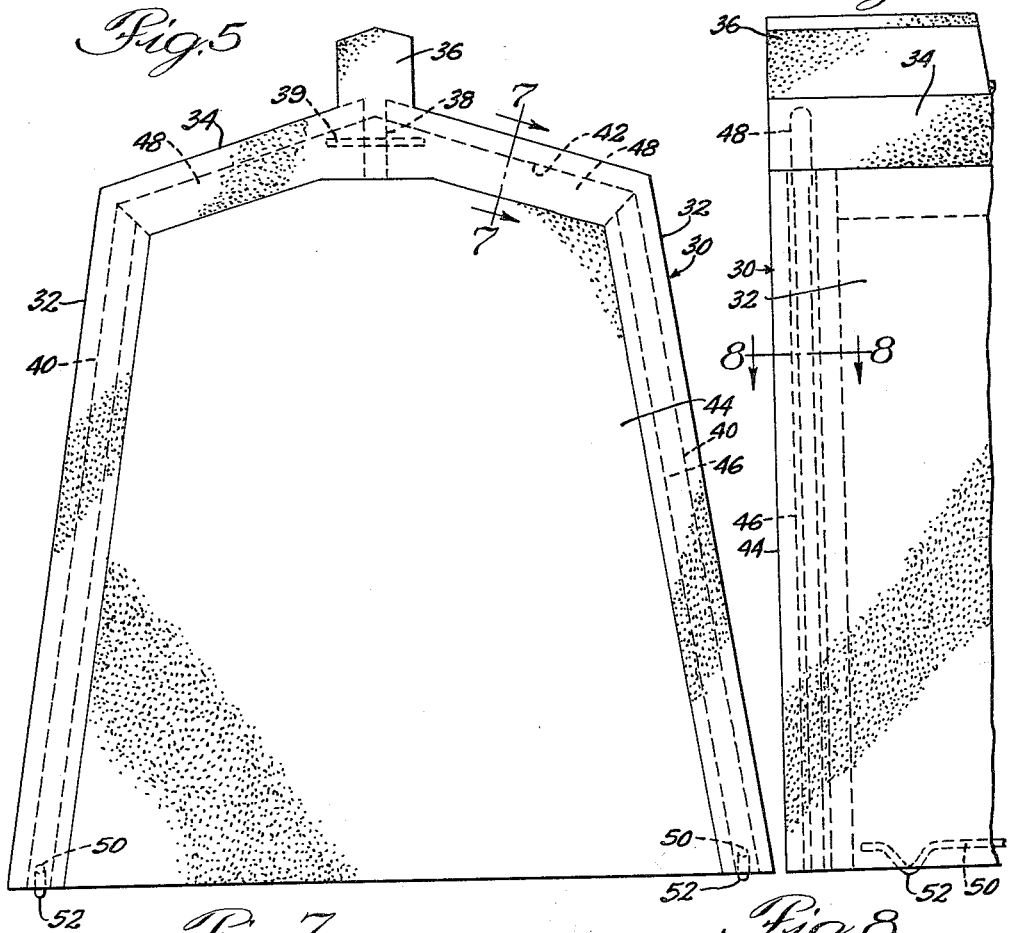
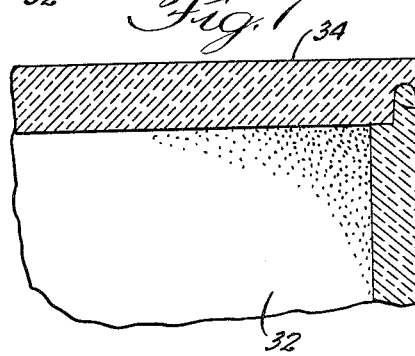
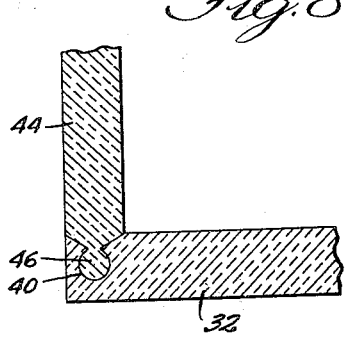
INVENTOR:
Robert A. Bruce,
BY Bair Freeman & Molinare
ATTORNEYS.

United States Patent Office 3,071,279
Patented Jan. 1, 1963

3,071,279
MILK BOTTLE CARRIER AND ENCLOSURE
Robert A. Bruce, % Barker Equipment Co.,
1256 15th St., Keosauqua, Iowa
Filed Apr. 25, 1960, Ser. No. 24,437
1 Claim. (Cl. 220—1)

This invention relates to enclosures for containers, such as for milk, orange juice and the like, and more particularly to enclosures of the general type referred to as porch boxes which serve to protect the contents therein from heat, cold, dust, dirt and animals. The invention also contemplates a novel combination of such an enclosure with a wire basket for containers of milk and the like.

One of the objects of this invention is to provide a novel enclosure of the character indicated, formed of light-weight material possessing high thermal insulating characteristics, in combination with a wire basket for milk containers and the like, constructed and arranged so that the basket and enclosure may be conveniently picked up and transported as a unit, and wherein the enclosure may be quickly and easily removed from the basket to afford access to the contents of the basket.

Another object is to provide a novel enclosure of the character indicated having an open bottom and an opening in the top, in combination with a wire basket for milk containers and the like, having a handle adapted to be positioned to extend through the opening in the top of the enclosure, whereby the assembly may be lifted by the handle and transported as a unit.

A further object is to provide a novel enclosure of the character indicated having an open bottom and formed of molded, expanded polystyrene, and provided with means molded in the lower portion thereof to provide a multiplicity of feet for supporting the enclosure on a porch, or the like.

Still another object is to provide a novel enclosure of the character indicated, in combination with a wire basket for milk containers and the like, which is efficient in use and light in weight for convenient handling, and which is capable of being economically manufactured.

Other objects and advantages of the present invention will be apparent from the following description, taken in connection with the accompanying drawings, in which:

FIGURE 1 is a perspective view of the novel enclosure and wire basket combination embodying the present invention, with the enclosure shown lifted upwardly with respect to the basket.

FIGURE 2 is a transverse sectional view through the enclosure and basket.

FIGURE 5 is an end view of a modified form of enclosure.

FIGURE 6 is a fragmentary side view of an end portion of the enclosure.

Figure 3:
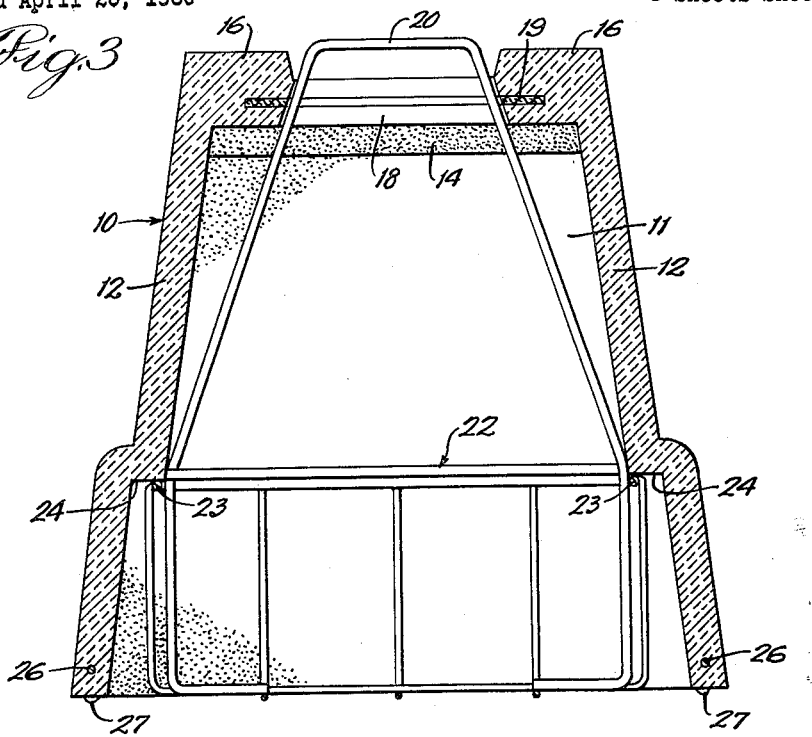
FIGURE 3 is a longitudinal sectional view through the enclosure and basket.

FIGURES 7 and 8 are transverse sectional views, taken substantially as indicated at lines 7—7 and 8—8 respectively, on FIGURES 5 and 6.

Porch boxes for enclosing containers of milk and the like as heretofore employed have, in the main, been produced in relatively sturdy form, and of a relatively heavy nature, so that they remained more or less permanently in position on the porch of the user, and necessitated opening a hinged cover or the like to afford access to the interior of the box. By reason of the nature of such prior constructions, such boxes have been relatively expensive to manufacture and did not afford adequate convenience for households where a large quantity of containers of milk or the like were temporarily stored, in that the containers necessarily had to be removed from the porch box one at a time, and then carried into the household.

In the construction illustrated in FIGURES 1 to 4 of the drawings, the enclosure indicated generally at 10, is formed as a unitary article of molded, expanded polystyrene, which is of extremely low density, and light in weight, and which possesses relatively high thermal insulating characteristics. The enclosure as shown comprises a pair of side walls 11, and a pair of end walls 12, interconnected by a top 14, and the entire constituting an inverted, box-like structure, open at its bottom, as clearly seen in FIGURES 2 and 3. The top 14 is provided with a pair of upstanding finger gripping portions 16, adjacent opposite ends, for convenience in removing the enclosure to expose the contents therebeneath.

The top 14 is provided with a centrally located, longitudinally extending opening 18, through which extends the upper end of a handle portion 20 of a wire basket or carrier 22, over which the enclosure is adapted to be fitted. The wire basket 22 is of more or less conventional design and is preferably constructed and arranged so as to properly support therein a plurality of various sizes of containers for milk and other liquids. In order to reduce to a practical minimum interchange of air within the enclosure by reason of the opening 18, I provide a sheet of flexible material 19, attached to the top 14, and extending across the opening 18. The sheet of flexible material is provided with a slit for accommodating the handle 20 of the basket. It will be apparent that when the handle is extended through the slit in the flexible sheet of material, said sheet of material 19, assumes a substantially fully closed relationship for sealing of the opening 18 in the enclosure. While the flexible sheet 19, as shown in FIGURES 2 and 3 of the drawings, is indicated as being molded in the top portion 14 of the enclosure, such a sheet of flexible material may be otherwise attached in proper relation to the top portion 14 with respect to the opening 18.

The pair of side walls 11, and/or the pair of end walls 12 of the enclosure, are formed with a downwardly facing, inwardly extending shoulder 24, dimensioned and arranged relative to the corresponding dimension of the basket so that when the enclosure is placed over the basket said shoulders are positioned immediately above the uppermost main frame wire 23 of the basket, as seen in FIGURES 2 and 3 of the drawings. By virtue of this construction, it will be apparent that when the enclosure is placed in cooperative relation to the basket, with the handle 20 extending through the top portion 14, and with the enclosure and basket resting upon the floor, the assembly of the enclosure and basket may be bodily picked up as a unit by grasping of the handle 20 so as to permit carrying the assembly into the household for removal of a portion or all of the contents from the basket. In the process of lifting the basket by the handle 20, the top frame wire 23 of the basket engages the shoulders 24 of the enclosure so that the enclosure is thereby supported on the basket. Furthermore, the arrangement is such that the person serving the household may utilize a corresponding basket for delivery of milk or other liquid commodities, and merely exchange it for the empty one on the door stoop covered by the enclosure.

Figure 4:
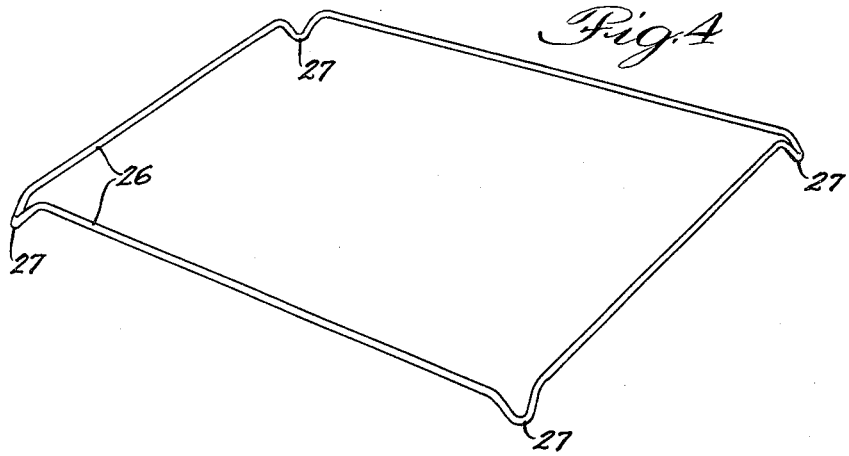
FIGURE 4 is a perspective view of a reinforcing wire for molding in the enclosure to provide feet therefor.

Molded in the lower portion of the enclosure is a reinforcing wire 26, of generally rectangular form, as seen in FIGURE 4, with corner portions 27 bent downwardly and extending slightly below the lower edge of the enclosure, to constitute feet for supporting the enclosure upon the floor. The wire feet serve to protect the lower edge of the enclosure from becoming readily damaged due to the nature of the material utilized for the enclosure.

By virtue of the construction above described the enclosure 10 will effectively serve to protect commodities, such as milk, against both heat and cold, as well as against dust, dirt and possible contact by animals. Because of the enclosure being of extremely light weight, the entire assembly may be quickly and easily lifted by the handle 20 of the basket and transported into the home for access to the contents of the basket. Due to the shape and dimensions of the enclosure, a number of such enclosures may be nested for storage and shipment.

In the modified construction represented in FIGURES 5 to 8 of the drawings, the enclosure represented generally at 30 is formed of molded, expanded polystyrene. In the main, the enclosure is of the same general dimensions as the enclosure represented in FIGURES 1 to 4 of the drawings, and consists of a unitary molded portion comprising a pair of upwardly inclined side walls 32, merging at their upper ends and connected to a top or roof portion 34. The top or roof portion is provided with a pair of finger engaging members 36 at opposite ends thereof, and is also provided with a centrally located slot 38, together with a flexible sealing sheet 39, similar to the construction shown in FIGURES 2 and 3. It is to be understood that the modified enclosure shown in FIGURES 5 to 8, is intended to be used in connection with the basket 22, shown in FIGURES 1 to 3. The slot 38 serves to accommodate the extension therethrough of the handle 20 of the basket 22, in the same manner as in the construction above described.

The inner surface of the end portions of each of the side walls 32 is formed with an undercut type of groove, as indicated at 40 in FIGURE 8 of the drawings. The under side of the top portion 34 is formed with a groove 42 as indicated in FIGURE 7 of the drawings. Cooperating with the unit comprising the side walls and the top portion, are a pair of end walls 44, the side edges of which are formed with a headed type of tongue, as indicated at 46, at opposite sides for cooperating with the grooves 40, of the side walls 30, and the top portions of the end walls are each formed with an upstanding tongue, as indicated at 48, for cooperation with the grooves 42 in the top portion 34. The end panels are molded as separate elements, and when the enclosure is to be assembled, each end panel is telescoped, with the pair of headed type of tongues 46 fitted in the grooves 40 of the side walls, and with the tongues 48 telescoped into the grooves 42 of the top portion 34. Because the elements of enclosure are made of molded expanded polystyrene, when the parts are so assembled they frictionally remain in such interconnected relation. If desired, however, suitable bonding adhesive may be employed to permanently secure the parts together.

Molded in the lower edge of each side wall 32, is a reinforcing wire 50, having downwardly offset portions 52, terminating slightly below the lower edge of the side wall, adjacent opposite ends, to provide feet for supporting the enclosure upon the floor.

In the construction disclosed in FIGURES 5 to 8, the same advantages result from the use of the enclosure in combination with a basket 22, as with the construction described in FIGURES 1 to 4. In this modified construction, it will be apparent that when the handle 20 is grasped, the basket will first be raised upwardly and the top main frame wire 23 thereof comes in contact with the walls of the enclosure, after which the weight of the enclosure will be picked up thereby.

Because the enclosure or housing of the present invention is extremely light weight, it alone might readily be blown off of a porch. Due to the interconnection between the enclosure and the basket 22, the enclosure, in operative relation to the basket, becomes relatively stable and remains in position over the basket until it is intentionally lifted off of the basket, or is moved with the basket as a unit, by lifting the assembly by the handle 20.

While I have herein shown and described certain preferred embodiments of my invention, manifestly it is capable of modification and rearrangement without departing from the spirit and scope thereof. I do not, therefore, wish to be understood as limiting this invention to the precise embodiments herein disclosed, except as I may be so limited by the appended claim.

I claim:

For use with an upwardly open wire basket for milk containers and the like having an upwardly extending handle, a downwardly open rigid housing of thermal insulating material for enclosing said basket and comprising a top, and side and end walls, the top of said housing being formed with an opening for accommodating the basket handle therethrough, a pair of opposite walls of said housing being formed with inwardly offset, downwardly facing shoulders, located so as to be positioned above the upper marginal edge of the basket, whereby when the basket is lifted by its handle the upper edge thereof engages said shoulders and lifts the housing therewith.

References Cited in the file of this patent
UNITED STATES PATENTS

| | | |
|---|---|---|
| D. 129,380 | Heuler | Sept. 9, 1941 |
| 1,790,299 | Foreman | Jan. 27, 1931 |
| 2,292,055 | Collins | Aug. 4, 1942 |
| 2,325,955 | Higgins | Aug. 3, 1943 |
| 2,773,727 | Bradley | Dec. 11, 1956 |
| 2,948,433 | Fineo | Aug. 9, 1960 |